United States Patent
Kim (10) Patent No.: US 8,340,417 B2
(45) Date of Patent: Dec. 25, 2012

(54) IMAGE PROCESSING METHOD AND APPARATUS FOR CORRECTING SKIN COLOR

(75) Inventor: Seung-hun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 340 days.

(21) Appl. No.: 12/837,641

(22) Filed: Jul. 16, 2010

(65) Prior Publication Data

US 2011/0013829 A1    Jan. 20, 2011

(30) Foreign Application Priority Data

Jul. 17, 2009    (KR) .................. 10-2009-0065477

(51) Int. Cl.
    *G06K 9/00*    (2006.01)
(52) U.S. Cl. ........................ 382/167; 382/162
(58) Field of Classification Search ................ None
    See application file for complete search history.

(56) References Cited

U.S. PATENT DOCUMENTS

| | | | |
|---|---|---|---|
| 7,773,826 B2* | 8/2010 | Watanabe et al. | 382/274 |
| 8,175,341 B2* | 5/2012 | Umeda | 382/117 |
| 2005/0129288 A1* | 6/2005 | Chen et al. | 382/118 |
| 2008/0158396 A1* | 7/2008 | Fainstain et al. | 348/246 |
| 2009/0214129 A1* | 8/2009 | Quan | 382/260 |

* cited by examiner

*Primary Examiner* — Li Liu
(74) *Attorney, Agent, or Firm* — Drinker Biddle & Reath LLP (57) ABSTRACT

Provided are an image processing method and an image processing apparatus for performing skin color correction for removing freckles and wrinkles by using mask pixels spaced apart from a center pixel by a predetermined number of pixels, a digital photographing apparatus using the image processing apparatus, and a computer readable storage medium having stored thereon a computer program for executing the method. According to various embodiments of the invention, the skin color correction for efficiently removing freckles and wrinkles and preserving an edge may be performed.

20 Claims, 11 Drawing Sheets

<BILATERAL FILTERING>    <PROCESSED ACCORDING TO THE PRESENT INVENTION>

FIG. 9B

<GAUSSIAN LOW PASS FILTERING + ADDITIONALLY PROCESSED>    <PROCESSED ACCORDING TO THE PRESENT INVENTION>

FIG. 11

IMAGE PROCESSING METHOD AND APPARATUS FOR CORRECTING SKIN COLOR

CROSS-REFERENCE TO RELATED PATENT APPLICATION

This application claims the benefit of Korean Patent Application No. 10-2009-0065477, filed on Jul. 17, 2009, in the Korean Intellectual Property Office, the disclosure of which is incorporated herein in its entirety by reference.

BACKGROUND

Embodiments of the invention relate to an image processing method and an image processing apparatus for correcting skin color in an input image, a digital photographing apparatus using the image processing apparatus, and a computer readable storage medium for executing the image processing method.

Since digital photographing apparatuses and image processing apparatuses are being widely distributed, demand for showing beautiful faces in captured images is increasing. Accordingly, a study on a face correction technique has been actively conducted for brightening a color tone of skin, removing freckles from the face, and thereby showing a clear face. A user may correct the captured face to look beautiful by simply using the face correction technique.

The function of removing freckles or wrinkles in the face correction function completely removes or lightens the freckles or wrinkles included in the face. The technique for removing freckles may include, for example, Gaussian smoothing by using a Gaussian low pass filter and bilateral filtering.

Figure 1:
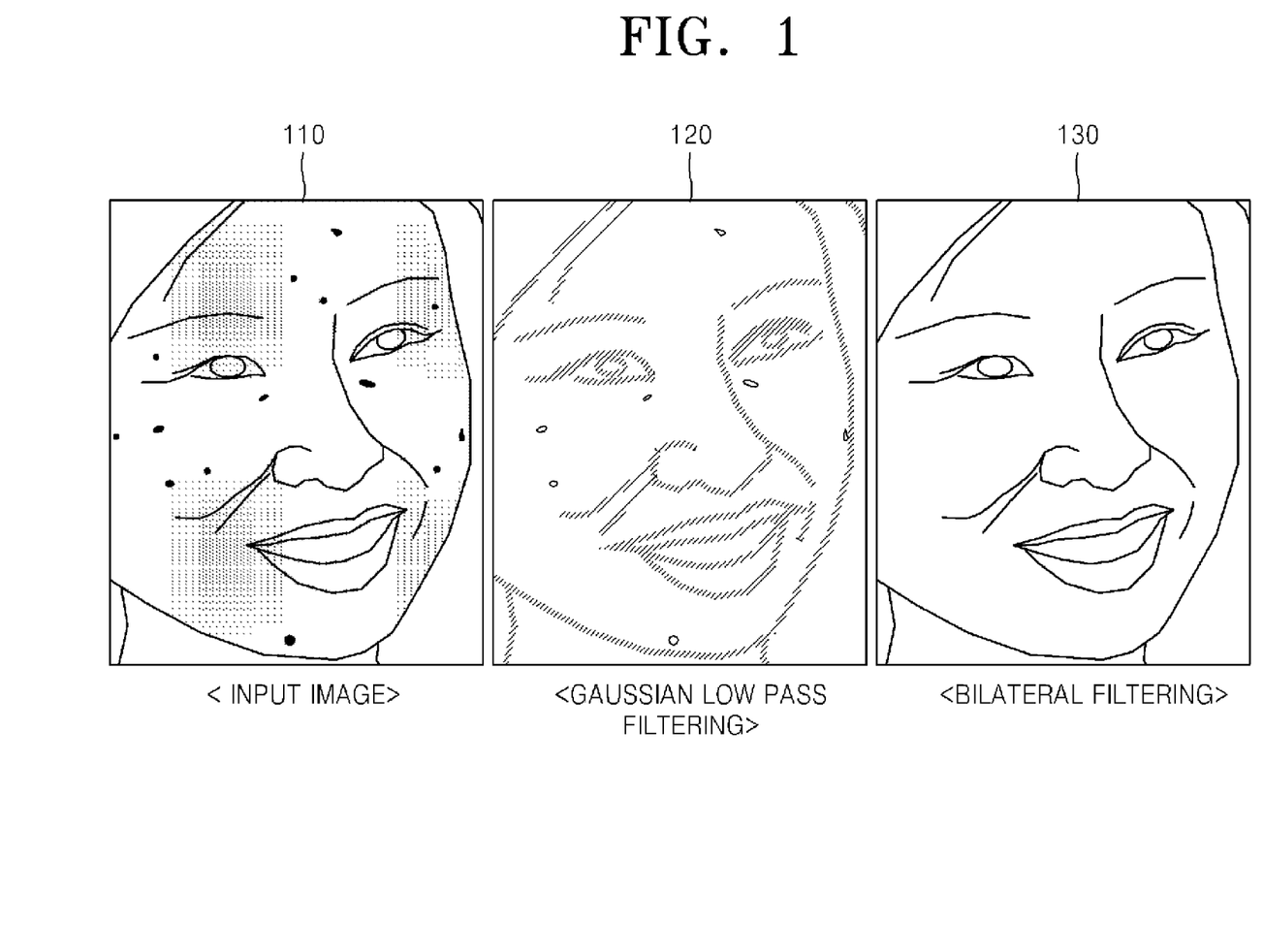
FIG. 1 is a pictorial diagram that illustrates images processed by using a Gaussian low pass filter and a bilateral filter.

FIG. 1 illustrates images processed by using a Gaussian low pass filter and a bilateral filter.

Figure 2:
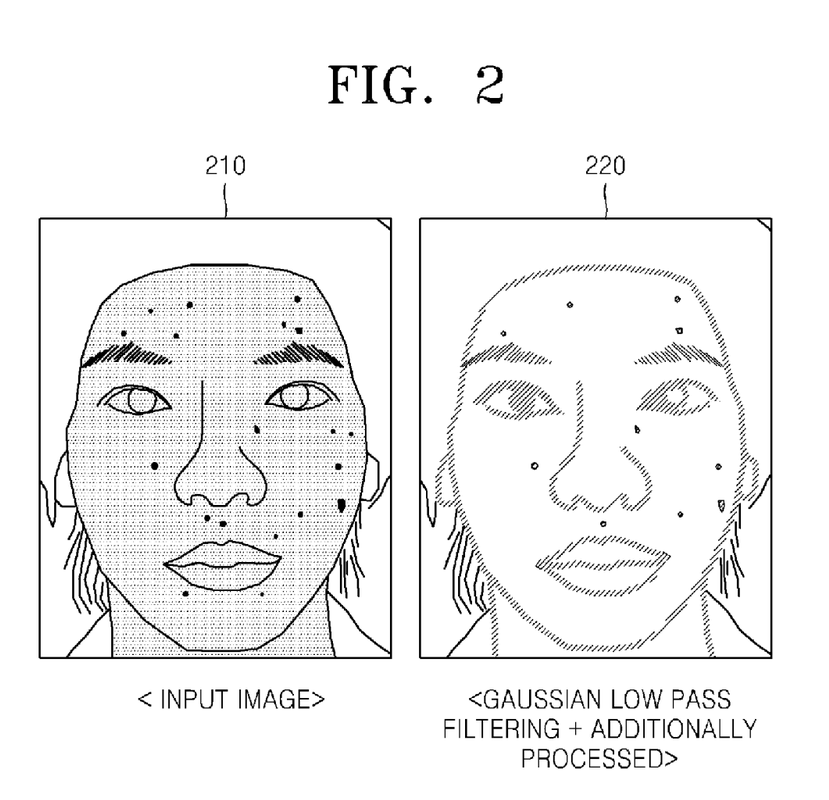
FIG. 2 is a pictorial diagram that illustrates an input image and the input image processed by using a Gaussian low pass filter and additional processes.

In skin correction using the Gaussian low pass filter, natural skin correction may not be expected. The process using the Gaussian low pass filter provides an effect wherein pixels that are determined as noise corresponding to freckles or wrinkles are appropriately mixed with surrounding pixels and thus it looks like the freckles or wrinkles are removed. Referring to a second image 120 of FIG. 1, freckles are blurred and widely spread compared with those of an input image 110. Also, in the process of using the Gaussian low pass filter, edges are blurred. Thus, in order to solve problems regarding blurred edges, other complicated processes may be performed after the filtering process using the Gaussian low pass filter. However, even if other additional processes are performed, blurred edges are still generated as shown in image 220 of FIG. 2 in which the process using the Gaussian low pass filter and other additional process are performed on an input image 210. Accordingly, if a blur is generated in the edges, a captured image may look like it is out of focus.

In addition, in the process of using the bilateral filter, the problem that edge components are blurred is less than other filters, but the edge blurring still exists. Also, when there is a large number of freckles, an unnatural image in which edges corresponding to outline of eyes, nose, and mouth and wrinkles may be obtained as illustrated in a third image 130 of FIG. 1 due to an effect in which the freckles are likely gathered together.

Figure 3:
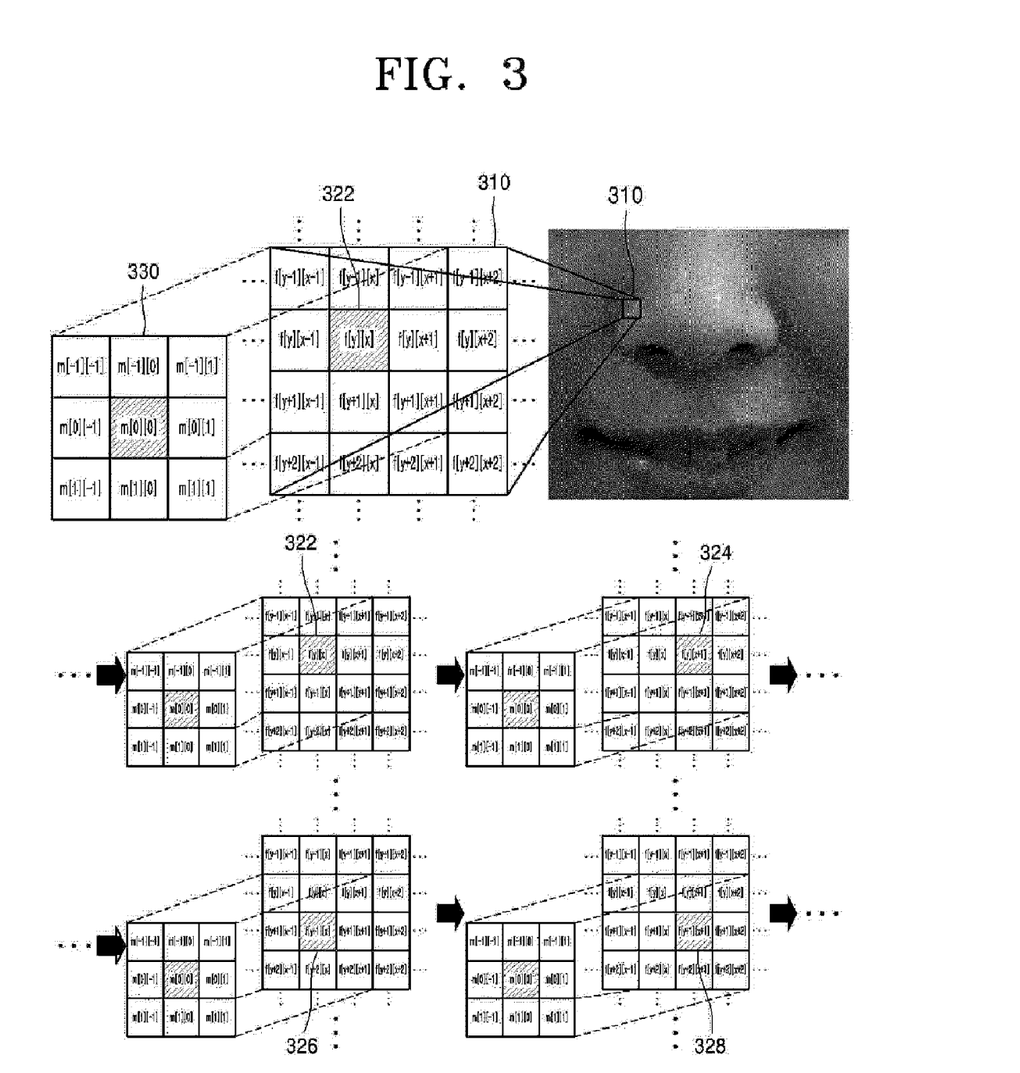
FIG. 3 is a pictorial diagram that illustrates a convolution operation for a general filtering process.

FIG. 3 illustrates a convolution operation for a general filtering process.

The general filtering process is performed by using center pixels 322, 324, 326, and 328 and adjacent surrounding pixels with respect to each pixel of an input image 310, as illustrated in FIG. 3. However, freckles have a larger size than general image noise and the difference in brightness between freckles and adjacent surrounding pixels is not great. Accordingly, the convolution operation by using the adjacent surrounding pixels is not effective in removing freckles in consideration of such property of freckles.

Related arts regarding skin color correction are as follows. U.S. 2002-160421, which is related to a method and system for enhancing portrait images, discloses that properties of regions such as eyes, nose, mouth, and skin are identified from a face image and the regions are processed by using appropriate filters, thereby solving problems regarding blurred edge. Japanese Patent Document No. 2005-162836 discloses that a face region is accurately extracted and the face is naturally and effectively corrected. In addition, related arts regarding face correction include Japanese Patent Document No. 1998-053026 and Japanese Patent Document No. 2002-345643. The details thereof are referred in this specification.

SUMMARY

Embodiments of the invention provide an image processing method and an image processing apparatus for correcting skin color, through which edges that correspond to outline of ears, eyes, mouth, and nose are preserved, by improving a function of removing freckles or wrinkles, a digital photographing apparatus using the image processing apparatus, and a computer readable storage medium having stored thereon a computer program for executing the method.

According to an embodiment of the invention, there is provided an image processing method, the method including: detecting a skin color region from an input image; taking a pixel included in the skin color region as a center pixel and determining a plurality of mask pixels located around the center pixel; calculating a difference value for each of the plurality of mask pixels, the difference value being the difference between a pixel value of a mask pixel and a pixel value of the center pixel; obtaining a first data value for each of the plurality of mask pixels based on a correction standard value, the first data value being the pixel value of a mask pixel when the difference value for the mask pixel is less than the correction standard value and the pixel value of the center pixel when the difference value for the mask pixel is the same as or greater than the correction standard value; obtaining a second data value by calculating the sum of the first data values for each of the plurality of mask pixels and dividing the sum of the first data values by the number of mask pixels; and correcting the pixel value of the center pixel according to the second data value.

In the determining of the plurality of mask pixels, the plurality of mask pixels may comprise a plurality of pixels located on a circle, an ellipse, a square, a combination of a circle and a square, or a combination of an ellipse and a square, the circle, the ellipse and the square being centered on the center pixel and having a size determined according to a mask size parameter.

The method may further include obtaining an average value of the second data value and the pixel value of the center pixel in the skin color region, wherein, in the correcting of the pixel value, the pixel value of the center pixel is corrected according to the average value.

The method may further include determining the mask size parameter according to the size of the skin color region. Also, the method may further include determining the correction standard value according to the average value of the pixels in the skin color region.

The method may further include, the skin color region being detected by comparing color component values of each of the pixels in the input image with ranges of skin color standard values based on a brightness value of each of the pixels in the input image. In addition, the method may include determining the correction standard value based on a brightness value of each of the pixels in the skin color region.

According to another embodiment of the invention, there is provided an image processing apparatus, the apparatus including: a skin color region detecting unit that detects a skin color region from an input image; a mask pixel determining unit that determines a center pixel within the skin color region and a plurality of mask pixels located around the center pixel; a difference value calculating unit that calculates a difference value for each of the plurality of mask pixels between a pixel value of a mask pixel and a pixel value of the center pixel; a first data value calculating unit that obtains a first data value for each of the plurality of mask pixels based on a correction standard value, the first data value being the pixel value of a mask pixel when the difference value for the mask pixel is less than the correction standard value and the pixel value of the center pixel when the difference value for the mask pixel is the same as or greater than the correction standard value; a second data value that obtains a second data value by calculating the sum of the first data values for each of the plurality of mask pixels and dividing the sum of the first data values by the number of mask pixels; and a correction unit that corrects the pixel value of the center pixel according to the second data value.

The mask pixel determining unit may determine that the plurality of mask pixels comprises a plurality of pixels located on a circle, an ellipse, a square, a combination of a circle and a square, or a combination of an ellipse and a square, the circle, the ellipse and the square being centered on the center pixel and having a size determined according to a mask size parameter.

The apparatus may further include an average value calculating unit that obtains an average value of the second data value and the pixel value of the center pixel in the skin color region, wherein the correction unit is designed to correct the pixel value of the center pixel according to the average value.

The apparatus may further include a mask size parameter determining unit that determines the mask size parameter according to the size of the skin color region. Also, the apparatus may further include a correction standard value determining unit that determines the correction standard value according to the average value of the pixels in the skin color region. In addition, the apparatus may include a skin color region detecting, unit is designed to detect the skin color region by comparing color component values of each of the pixels in the input image with ranges of skin color values based on a brightness value of each of the pixels in the input image. In an embodiment, a digital photographing apparatus includes the image processing apparatus.

According to another embodiment of the invention, there is provided a digital capturing apparatus that uses the image processing apparatus.

According to another embodiment of the invention, there is provided a non-transitory computer program product, comprising a computer usable medium having a computer readable program code embodied therein, said computer readable program code adapted to be executed to implement a method for correcting an image, said method including: detecting a skin color region from an input image; taking a pixel included in the skin color region as a center pixel and determining a plurality of mask pixels located around the center pixel; calculating a difference value for each of the plurality of mask pixels, the difference value being the difference between a pixel value of a mask pixel and a pixel value of the center pixel; obtaining a first data value for each of the plurality of mask pixels based on a correction standard value, the first data value being the pixel value of a mask pixel when the difference value for the mask pixel is less than the correction standard value and the pixel value of the center pixel when the difference value for the mask pixel is the same as or greater than the correction standard value; obtaining a second data value by calculating the sum of the first data values for each of the plurality of mask pixels and dividing the sum of the first data values by the number of mask pixels; and correcting the pixel value of the center pixel according to the second data value.

In an embodiment of the computer usable medium, the plurality of mask pixels comprise a plurality of pixels located on a circle, an ellipse, a square, a combination of a circle and a square, or a combination of an ellipse and a square, the circle, the ellipse and the square being centered on the center pixel and having a size determined according to a mask size parameter.

In an embodiment of the computer usable medium, the mask size parameter is determined according to the size of the skin color region.

In an embodiment of the computer usable medium, an average value of the second data value and the pixel value of the center pixel in the skin color region is obtained and the pixel value of the center pixel is corrected according to the average value.

In an embodiment of the computer usable medium, the correction standard value is determined according to the average value of the pixels in the skin color region.

In an embodiment of the computer usable medium, the skin color region is detected by comparing color component values of each of the pixels in the input image with ranges of skin color standard values based on a brightness value of each of the pixels in the input image.

BRIEF DESCRIPTION OF THE DRAWINGS

The above and other features and advantages of various embodiments of the invention will become more apparent by describing in detail exemplary embodiments thereof with reference to the attached drawings in which.

DETAILED DESCRIPTION OF THE EMBODIMENTS

Hereinafter, embodiments of the invention will be described more fully with reference to the accompanying drawings and details which would have been obvious to one of ordinary skill in the art can be omitted.

The specification and the drawings are not provided to limit the invention and the scope of exemplary embodiments may be defined by the claims. The terminology used herein is interpreted to correspond to the meaning and concept of technical ideas of the invention so as to appropriately describe the embodiments of the invention.

An image processing apparatus according to an embodiment of the invention may be any apparatus as long as the apparatus may receive an image and process the input image. According to an embodiment of the invention, the image processing apparatus may be implemented as a digital photographing apparatus. However, embodiments of the invention are not limited to a digital photographing apparatus.

Figure 4:
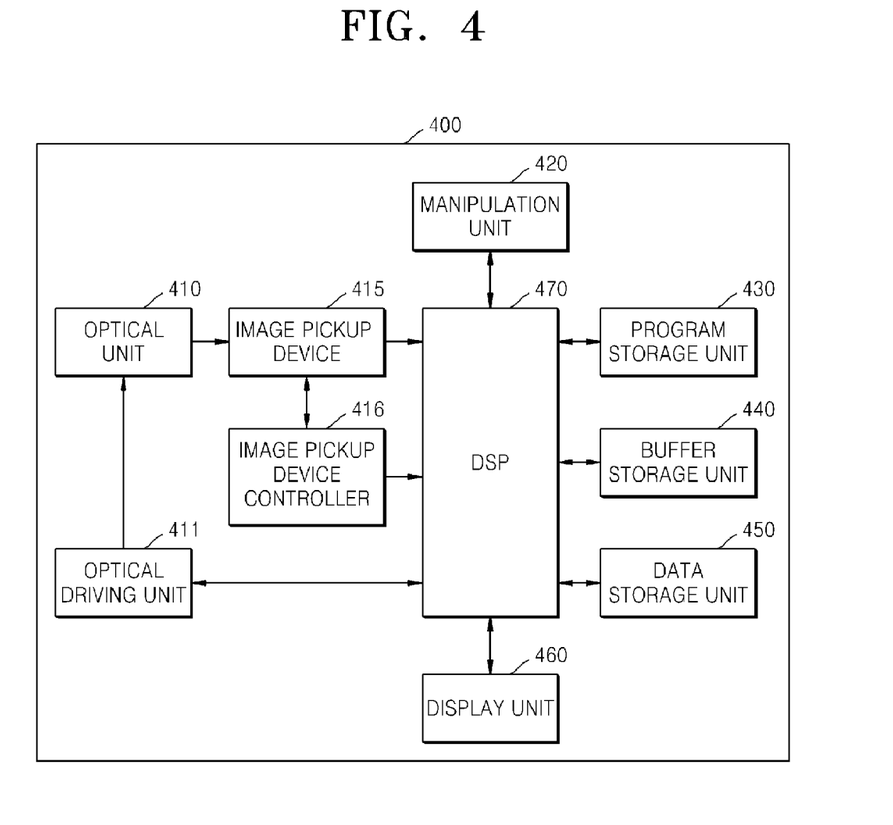
FIG. 4 is a block diagram of an image processing apparatus according to an embodiment of the invention.

FIG. 4 is a block diagram of an image processing apparatus 400 according to an embodiment of the invention.

The image processing apparatus 400 according to the present embodiment may include an optical unit 410, an optical driving unit 411, an image pickup device 415, an image pickup device controller 416, a manipulation unit 420, a program storage unit 430, a buffer storage unit 440, a data storage unit 450, a display unit 460, and a digital signal processor (DSP) 470.

The optical unit 410 provides an optical signal input corresponding to a photographed subject to the image pickup device 415. The optical unit 410 may include at least one selected from the group consisting of a zoom lens, which controls a viewing angle so as to be narrowed or widened according to a focal length, and a focus lens, which focuses the subject. In addition, the optical unit 410 may further include an iris, which controls light intensity.

The optical driving unit 411 controls positioning of the lens and opening/closing of the iris. The position of the lens may be moved to focus on the subject. Also, opening/closing of the iris is controlled so as to control the light intensity. The optical driving unit 411 may control the optical unit 410 according to a control signal automatically generated according to an image signal input in real-time or a control signal input by a user.

An optical signal that the optical unit 410 may transmit forms the image of the subject on a light receiving surface of the image pickup device 415. The image pickup device 415 may be a charge coupled device (CCD) or a complementary metal oxide semiconductor image sensor (CIS) which converts an optical signal into an electric signal. The sensitivity of the image pickup device 415 may be controlled by the image pickup device controller 416. The image pickup device controller 416 may control the image pickup device 415 according to a control signal automatically generated according an image signal input in real-time or a control signal input by a user.

The manipulation unit 420 is used to input a control signal from the outside, such as from a user. The manipulation unit 420 may include a shutter-release button, a power button, a wide angle-zoom button and a telephoto-zoom button, and various other function buttons, wherein the shutter-release button may input a shutter-release signal for capturing an image by exposing the image pickup device 415 to light for a predetermined time, the power button may connect a power source, the wide angle-zoom button and the telephoto-zoom button may widen or narrow a viewing angle according to an input, and the various function buttons may respectively be for selecting a mode such as a text input mode, a capturing mode, or a reproducing mode, for selecting a white balance setting function, and for selecting an exposure setting function. The manipulation unit 420 may be various types of buttons. However, embodiments of the invention are not limited thereto and the manipulation unit 420 may be realized in any form, as long as a user may input a signal, such as a keyboard, a touch pad, a touch screen, or a remote controller.

Also, the image processing apparatus 400 includes the program storage unit 430, the buffer storage unit 440, and the data storage unit 450, wherein the program storage unit 430 stores programs such as an operating system for driving the digital camera and application systems, the buffer storage unit 440 temporarily stores data needed for performing operations or result data, and the data storage unit 450 stores image files including image signals and various information needed by the programs. Some embodiments may have fewer or more storage units than those shown in the embodiment of FIG. 4.

In addition, the image processing apparatus 400 includes the display unit 460 so as to display the operation state of the image processing apparatus 400 and information corresponding to the image captured in the image processing apparatus 400. The display unit 460 may provide visible information and/or auditory information to a user. In order to provide the visible information, the display unit 460 may be, for example, a liquid crystal display (LCD) panel, an organic light emitting display (OLED) panel, or an electrophoretic display (EPD) panel.

Moreover, the image processing apparatus 400 includes the DSP 470, which processes an input image signal and controls each element according to the processed signal or a signal input from the outside.

Skin color correction for removing freckles may be performed in the DSP 470. Hereinafter, the DSP 470 will be described in more detail.

Figure 5:
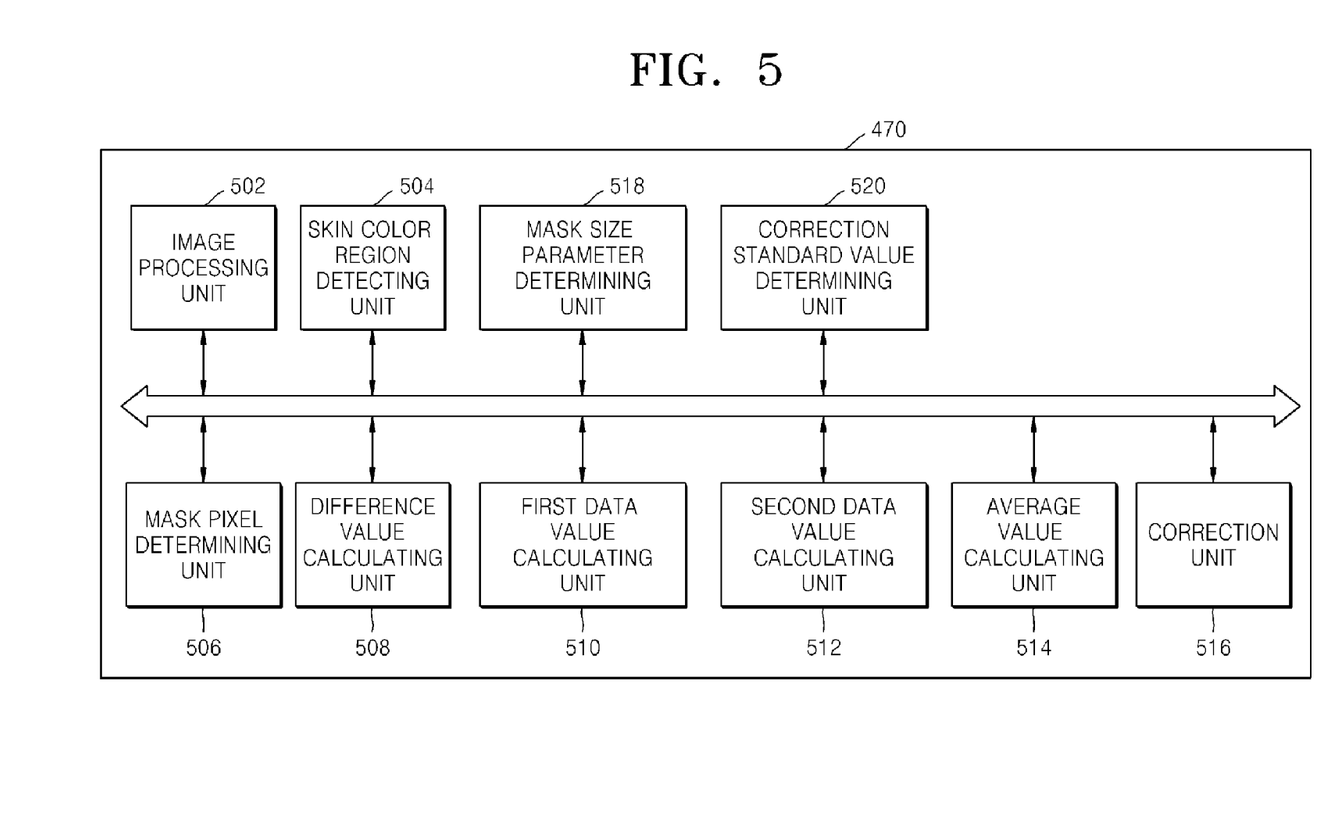
FIG. 5 is a block diagram of a digital signal processor (DSP) according to an embodiment of the invention.

FIG. 5 is a block diagram of the DSP 470 according to an embodiment of the invention.

The DSP 470 according to the present embodiment includes an image processing unit 502, a skin color region detecting unit 504, a mask pixel determining unit 506, a difference value calculating unit 508, a first data value calculating unit 510, a second data value calculating unit 512, and a correction unit 516. Various embodiments of the invention may not include all of the components of the DSP 470 shown in FIG. 5.

The image processing unit 502 performs analog-digital conversion for an image signal input from the image pickup device 415 and performs image signal processing such as gamma correction, color-coordinate conversion, color temperature control, color filter array interpolation, and color enhancement.

Also, the image processing unit 502 may perform an algorithm for auto white balance or auto exposure. In addition, the image processing unit 502 may perform processing such as size transformation and image compression so as to generate an image file having a predetermined form or may perform decompression on a previously compressed stored image file so as to perform predetermined processing on the decompressed image file.

In addition, when an image is captured and input according to the present embodiment, the image processing unit 502 may perform appropriate processing on an input image signal input in real-time in a live-view mode and may perform appropriate processing on an input image signal captured according to the shutter-release signal.

The skin color region detecting unit 504 detects a skin color region in an input image. The skin color correction is performed only for the skin color region and is not performed for hair regions, eyebrows regions, eyes regions, and regions other than the face. Thus, the skin color region detecting unit 504 may detect region with skin color. In order to detect the skin color region, color information about the input image is used so as to determine whether a color is a skin color and thus the skin color region may be detected. The color information may be, for example, Cb values and Cr values, in YCbCr coordinates. In order to detect the skin color region, the skin color region detecting unit 504 uses ranges of Cb and Cr values that are previously determined to correspond to skin color and compares the Cb values and the Cr values of pixels of the input image with the previously determined ranges of Cb and Cr values. Accordingly, when some of the Cb values and the Cr values of the input image are included in the range, the corresponding pixels may be determined as the skin color region.

Figure 6A:
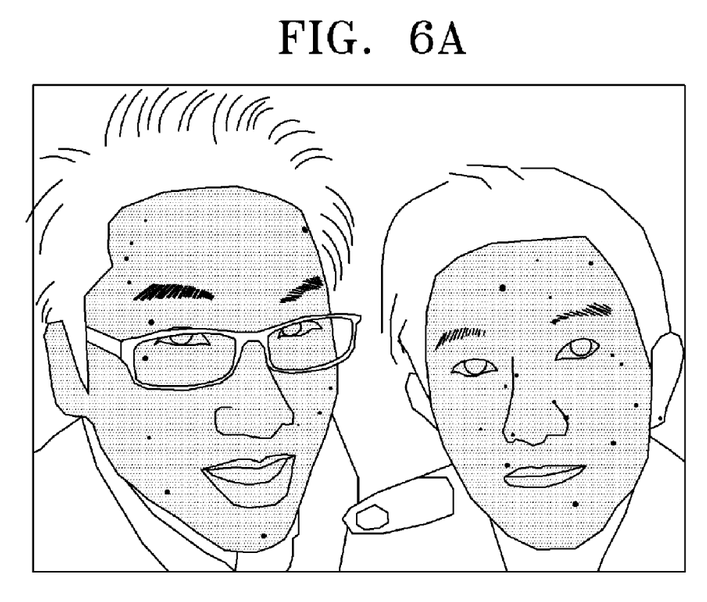
FIGS. 6A and 6B are pictorial diagrams that illustrate images for explaining detecting of a skin color region.
Figure 6B:
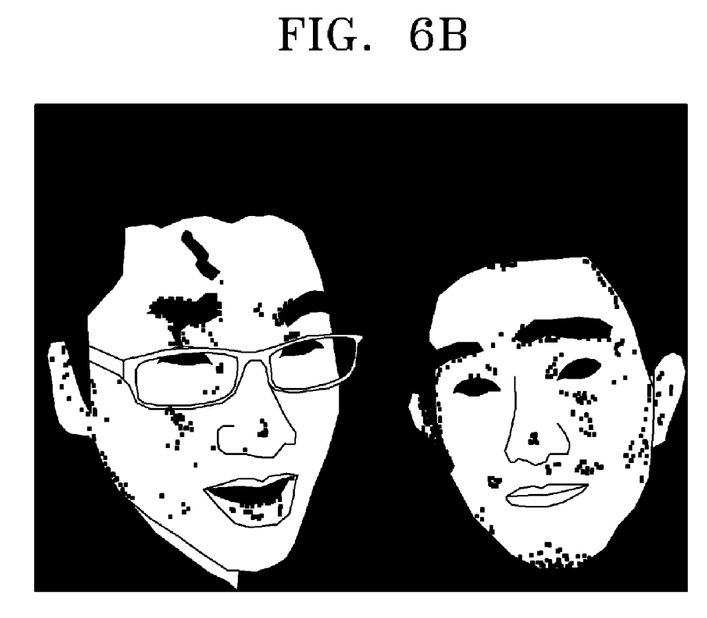

FIGS. 6A and 6B illustrate images for explaining detecting of the skin color region. FIG. 6A is an input image and FIG. 6B is a result image in which skin color detection is performed. When the skin color detection is performed, the skin color region are distinguished from regions that are not skin colored, such as hair regions, eyebrows regions, eyes regions, and glasses regions.

The skin color correction is performed on each of the pixels determined as the skin color region. For each of the pixels, the mask pixel determining unit 506 takes the pixel as a center pixel and determines a plurality of mask pixels located around the center pixel. The plurality of mask pixels may be determined by the form of a mask that is previously determined.

Figure 7:
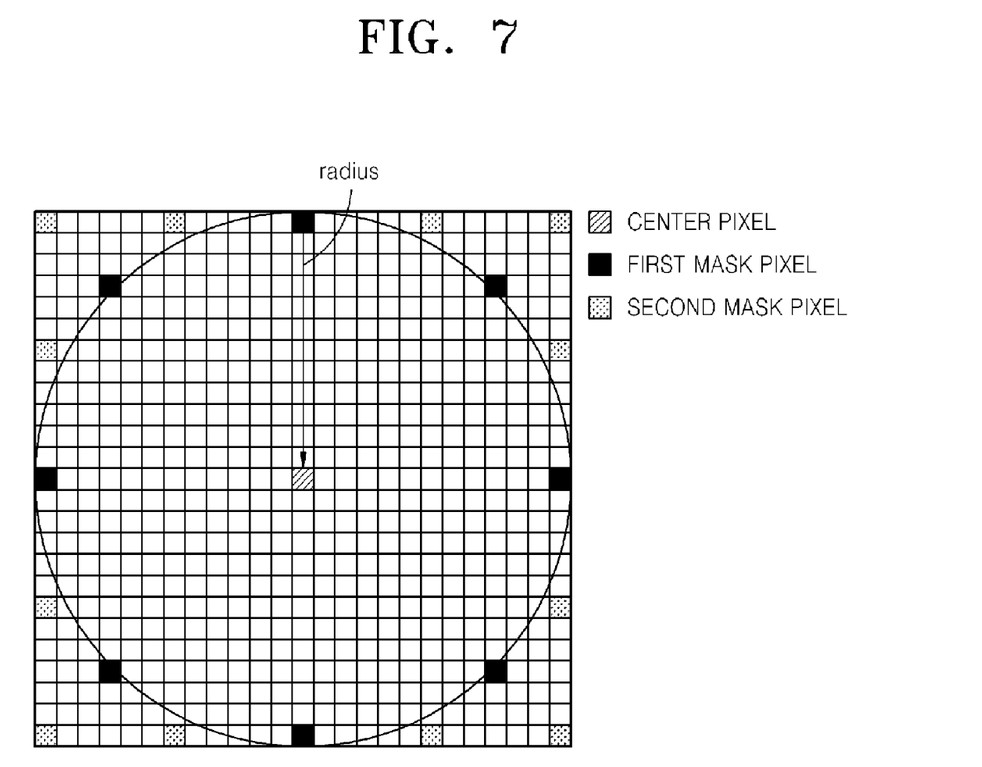
FIG. 7 is a pictorial diagram that illustrates forms of mask pixels, according to an embodiment of the invention.

FIG. 7 illustrates the forms of the mask pixels, according to an embodiment of the invention.

According to the present embodiment, the mask pixel determining unit 506 determines pixels spaced apart from the center pixel by a predetermined number of pixels as the mask pixels. Freckles or wrinkles are generally larger than general image noise and the difference in brightness between the freckles or wrinkles and surrounding pixels is not great. In an embodiment of the invention, the pixels spaced apart from the center pixel by the predetermined number of pixels are used to correct skin color and thus the freckles or wrinkles may be efficiently removed.

The size of the mask may be determined by a mask size parameter (radius). The mask size parameter may be a previously determined value or may vary according to an input image. The mask may be formed of a plurality of pixels (first mask pixels) located on a circle centered around the center pixel and having a radius corresponding to the mask size parameter, a plurality of pixels (second mask pixels) located on a square centered around the center pixel and having the size determined according to the mask size parameter, or a combination of the first mask pixels and the second mask pixels. Also, the mask may be defined according to various forms such as an ellipse or a rectangle.

The mask pixel determining unit 506 determines the first mask pixels, the second mask pixels, or a combination of the first mask pixels and the second mask pixels as the mask pixels with respect to the center pixel according to the form of the mask shown in FIG. 7 and the mask size parameter.

When the mask pixels are determined, a filtering process defined by Equation 1 is performed for the center pixel by using the plurality of mask pixels.

$$R[y][x] = \frac{\sum_{p \in use(\Omega_{radius})} \begin{cases} \text{if } (|f(s) - f(p)| < t) \to f(p) \\ \text{else} \to f(s) \end{cases}}{\text{Number (use } (\Omega_{radius}))} \quad \text{[Equation 1]}$$

Wherein $R[y][x]$ is a second data value, wherein the second data value is a pixel value obtained as a result of the filtering process, x and y are locations of the center pixel currently in process, p is one of the mask pixels, $\Omega_{radius}$ is a set of the mask pixels of the mask, in which the size thereof is determined by the mask pixel parameter, $use(\Omega)$ is a set of the mask pixels of the used masks, $p \in use(\Omega)$ is an element p of $use(\Omega)$, Number ($use(\Omega)$) is the number of the mask pixels used, s is the center pixel that is currently in process, f(p) is a pixel value at the location of p of the mask pixel in the input image, f(s) is a pixel value at the location of s of the center pixel in the input image, t is a correction standard value that is less than a maximum brightness value, and $|f(s)-f(p)|$ is an absolute value of the difference in the pixel values between s and p.

The difference value calculating unit 508 calculates the difference value between each of the mask pixels and the center pixel. In order to calculate the difference value, the difference value calculating unit 508 subtracts, for example, the pixel value of the center pixel from the pixel value of each of the mask pixels and obtains the absolute values of the differences. The pixel value is a brightness value of the pixels, for example, a Y value in the YCbCr coordinates.

When the difference value between the center pixels and one of the mask pixels p is less than the correction standard value t, the first data value calculating unit 510 takes the pixel value f(p) of the mask pixel as the first data value, and when the difference value is the same as or greater than the correction standard value t, the first data value calculating unit 510 takes the pixel value f(s) of the center pixel as the first data value, thereby determining the first data value. When the difference value for one of the mask pixels p is less than the correction standard value t, it seems that the mask pixel p has the skin color and thus the pixel value f(p) of the mask pixel p is used. When the difference value is greater than the correction standard value t, it seems that the mask pixel p is not part of the skin color region, such as hair regions, and thus the pixel value f(s) of the center pixel s is used. Accordingly, a blur may not occur at edges.

The second data value calculating unit 512 calculates the second data value $R[y][x]$ by calculating the sum of the first data values for each of the plurality of mask pixels and dividing the sum of the first data values by the number Number ($use(\Omega)$) of the mask pixels.

The correction unit 516 corrects the pixel value f(s) of the center pixel s according to the second data value $R[y][x]$. For example, the correction unit 516 replaces the pixel value f(s) of the center pixel s with the second data value $R[y][x]$.

Figure 8:
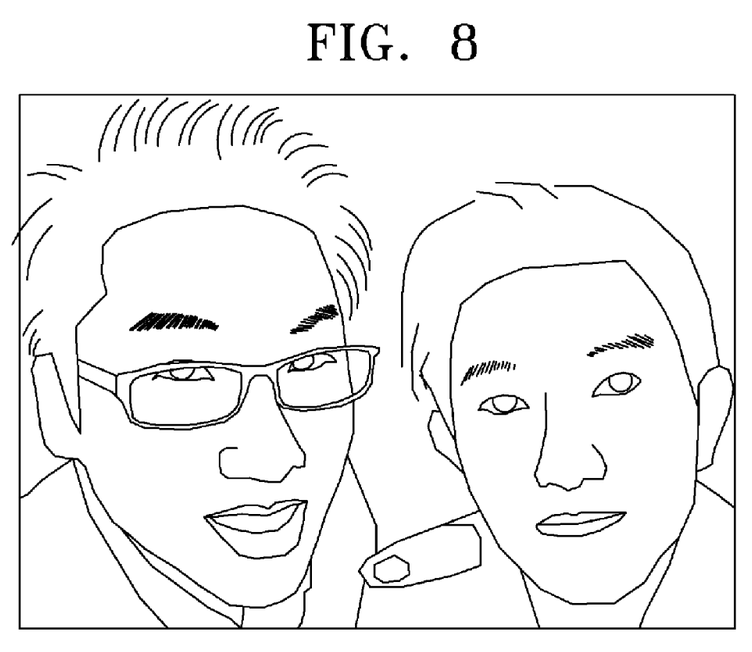
FIG. 8 is a pictorial diagram that illustrates a result image processed in the image processing apparatus of FIG. 4 according to an embodiment of the invention.

FIG. 8 illustrates a result image processed in the image processing apparatus 400 according to an embodiment of the invention. In comparison with the input image shown in FIG. 6A, in the result image shown in FIG. 8, freckles and wrinkles are effectively removed while edges that correspond to outline of ears, eyes, mouth, and nose are well preserved.

According to another embodiment of the invention, the image processing apparatus 400 may further includes an average value calculating unit 514. The average value calculating unit 514 calculates an average value of the second data value $R[y][x]$ and the pixel value of the center pixel. Here, the correction unit 516 corrects the pixel value f(s) of the center pixel s according to the average value calculated in the average value calculating unit 514. Accordingly, according to the present embodiment of the invention, freckles and wrinkles are efficiently corrected and a more natural image may be obtained.

According to another embodiment of the invention, the DSP 470 further includes a mask size parameter determining unit 518. The mask size parameter determining unit 518 determines the mask size parameter according to the size of the skin color region. Since the size of freckles and wrinkles increases as the size of a face in an input image increases, the mask size parameter is determined according to the size of the skin color region and thus freckles and wrinkles may be efficiently corrected.

According to another embodiment of the invention, the DSP 470 further includes a correction standard value determining unit 520. The correction standard value determining unit 520 determines the correction standard value t according to the average value of the pixel values of the skin color region. The pixel values may be brightness values. Since the correction standard value t is determined according to the skin color, the degree of correction may be controlled and a more natural skin color correction may be performed. For example, the correction standard value t may increase as the average value of the pixel value in the skin color region increases.

Figure 9A:
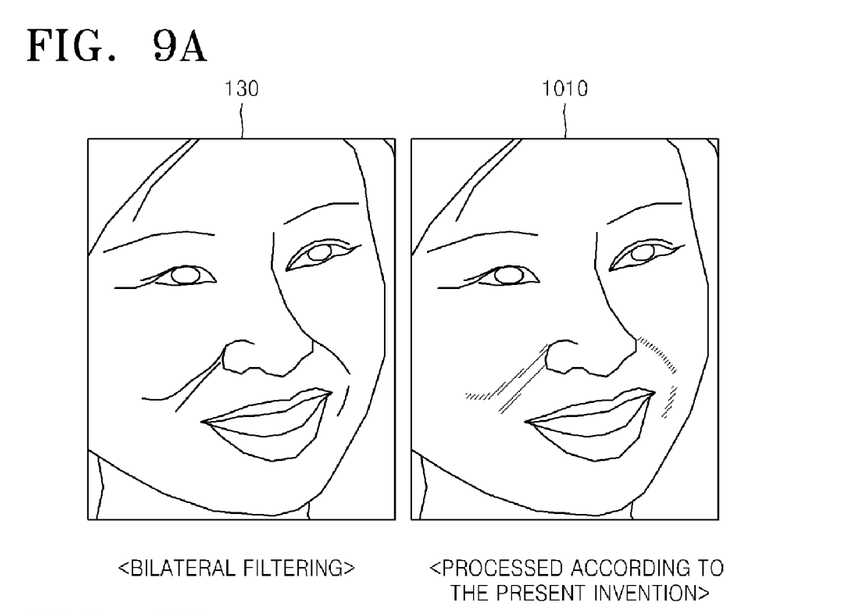
FIGS. 9A and 9B are pictorial diagrams that illustrate images respectively obtained as results of general skin color correction and as results of skin color correction according to an embodiment of the invention.
Figure 9B:
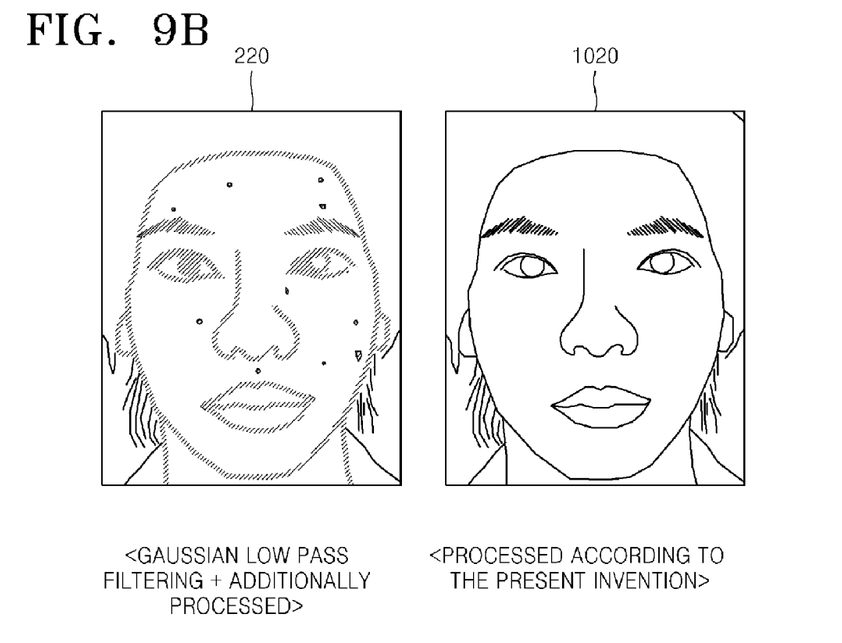

FIGS. 9A and 9B illustrate images respectively obtained as results of general skin color correction and as results of the skin color correction according to an embodiment of the invention.

FIG. 9A illustrates a result image 130 obtained by bilateral filtering and a result image 1010 processed according to an embodiment of the invention. As shown in FIG. 9A, the result image 130 obtained by Bilateral filtering shows unnatural skin colors in the skin color region around cheeks, eyes, a mouth, and a nose, and edges are excessively emphasized in eyebrows and wrinkles around mouth, thereby obtaining unnatural result image. However, the result image 1010 processed according to an embodiment of the invention shows natural skin color and edges that are well preserved.

FIG. 9B illustrates a result image 220 obtained after Gaussian low pass filtering and an additional process, and a result image 1020 processed according to an embodiment of the invention. As shown in FIG. 9B, a blur occurs in edges, such as the lips and an outline of the face, and freckles or pimples are not efficiently removed in the result image 220 obtained after Gaussian low pass filtering and an additional process, whereas freckles or pimples are efficiently removed and the edges such as the lips and an outline of the face are well preserved in the result image 1020 processed according to an embodiment of the invention.

Figure 10:
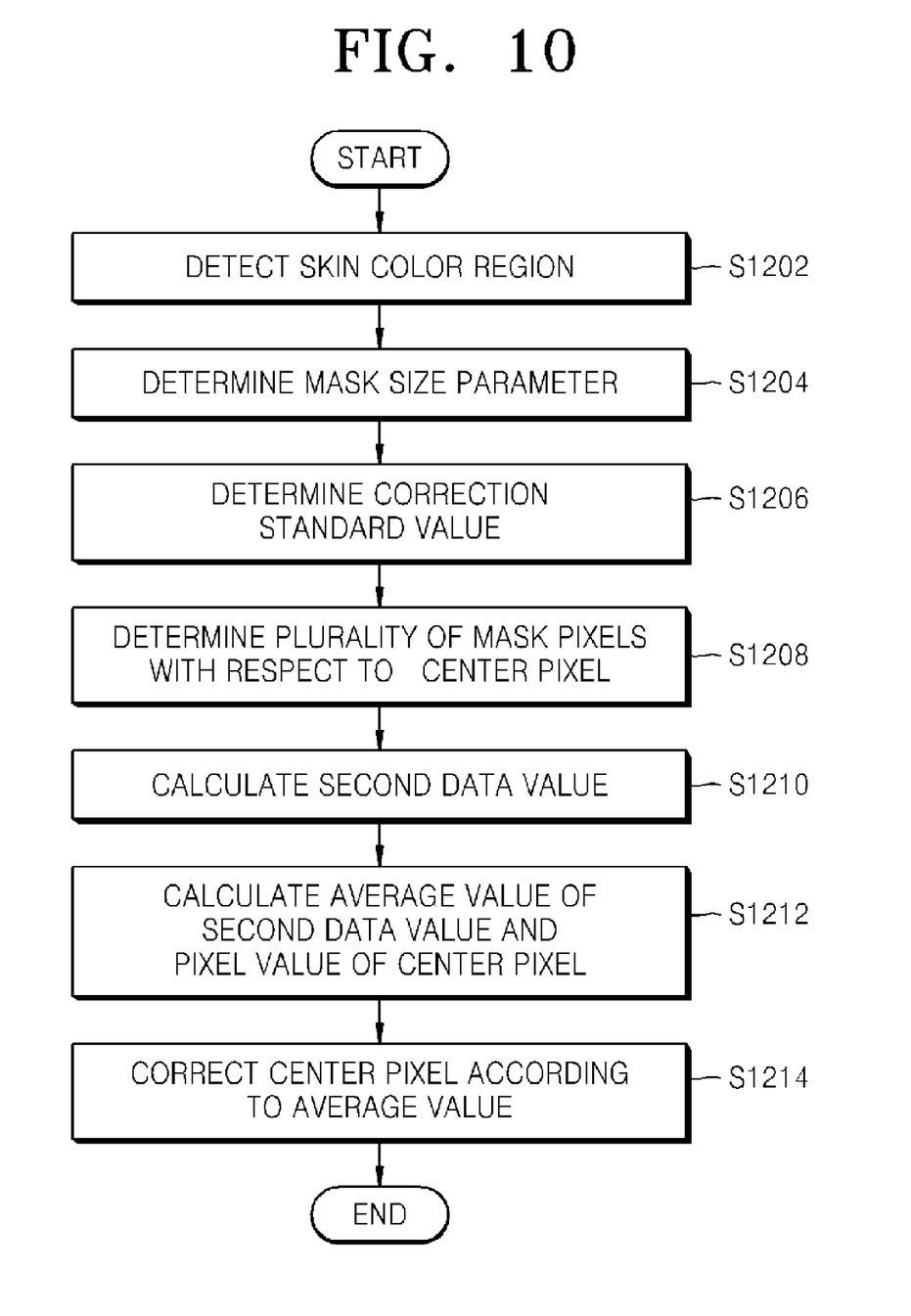
FIG. 10 is a flowchart illustrating an image processing method according to an embodiment of the invention.

FIG. 10 is a flowchart illustrating an image processing method according to an embodiment of the invention.

The image processing method according to the present embodiment may be performed in response to a user input that is input through the manipulation unit 420 or may be automatically performed by setting a mode in the image processing method that automatically executes the image processing method.

In the image processing method, when an input image is input, skin color region is detected in the input image, in operation S1202. The skin color region may be detected by, for example, determining whether the color of a region is a skin color by using color information of the input image. The color information may be, for example, Cb values and Cr values, in YCbCr coordinates. In order to detect the skin color region, ranges of Cb and Cr values that correspond to skin color are previously determined and the Cb values and the Cr values of pixels of the input image are compared with the previously determined ranges of Cb and Cr values. When some of the Cb values and the Cr values of the input image are included in the range, the corresponding pixels may be determined as the skin color region.

When the skin color region is detected, respective pixels included in the skin color region are determined as a center pixel s and a plurality of mask pixels p with respect to the center pixel s are determined, in operation S1208. The plurality of mask pixels p may be determined by the form of a mask that is previously determined. The form of the mask and the plurality of mask pixels p are described with reference to FIG. 7.

A previously determined fixed mask size parameter may be used as the mask size parameter. According to another embodiment of the invention, when the skin color region is detected, in operation S1202, the mask size parameter may be determined in operation S1204 according to the size of the skin color region. In an embodiment, the correction standard value is determined in operation S1206.

When the plurality of mask pixels p are determined, the second data value R[y][x] is calculated by using Equation 1, in operation S1210. The calculation of the second data value R[y][x] will be described again with reference to FIG. 11. When the second data value R[y][x] is calculated, the pixel value f(s) of the center pixel s is corrected according to the second data value R[y][x].

Figure 11:
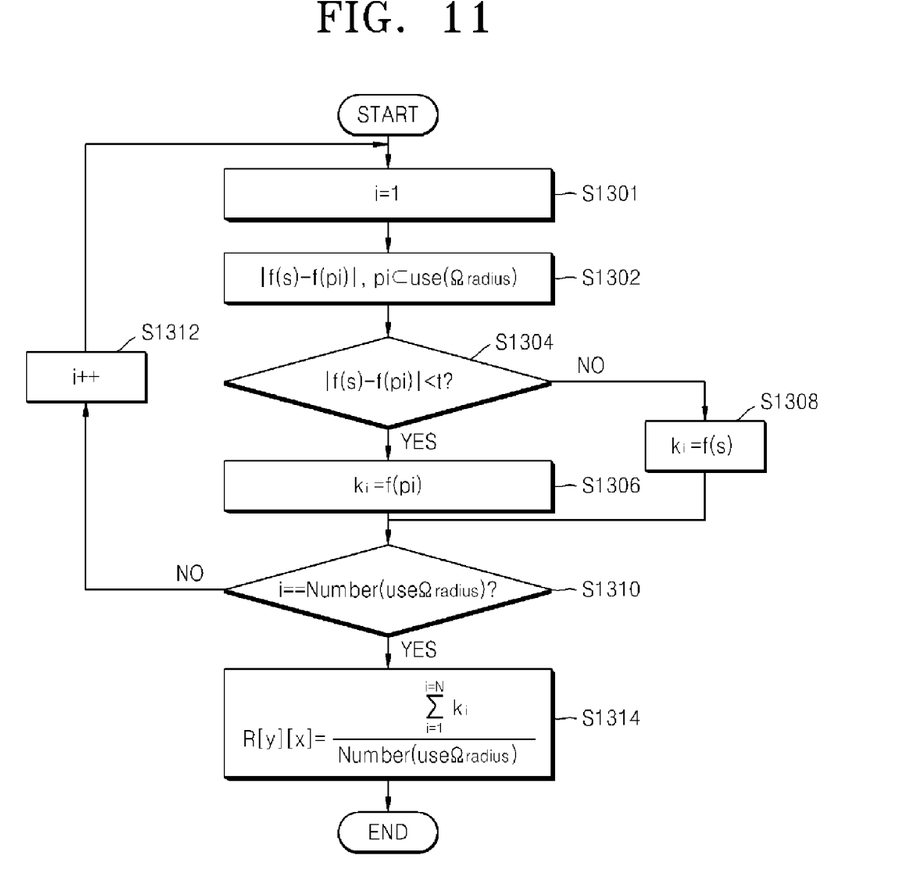
FIG. 11 is a flowchart illustrating a process of obtaining a second data value from a center pixel and a plurality of mask pixels.

According to another embodiment of the invention, an average value of the second data value R[y][x] and the pixel value f(s) of the center pixel s is calculated, in operation S1212, and then the pixel value f(s) of the center pixel s may be corrected according to the average value in operation S1214:

FIG. 11 is a flowchart illustrating a process of obtaining the second data value (R(y][x]) using the center pixel s and the plurality of mask pixels p.

When the plurality of mask pixels p are determined, a variable i is initialized in operation S1301, and the difference value $|f(s)-f(p_i)|$ between the center pixel s and one of the mask pixels p is obtained with respect to each of the mask pixels p, in operation 1302. Here, $p_i$ denotes the $i^{th}$ mask pixel p. Then, in operation S1304, whether the difference value $|f(s)-f(p_i)|$ is less than the correction standard value t is determined for each of the mask pixels p.

The correction standard value t may be previously determined. In the image processing method according to another embodiment of the invention, the correction standard value t may be determined according to the average value of pixel values in the skin color region, in operation S1306. For example, the correction standard value t may increase as the average value of the pixel values in the skin color region increases.

When the difference value $|f(s)-f(p_i)|$ is less than the correction standard value t, the pixel value f(p) of the mask pixel p is determined as a first data value $k_i$, in operation S1306. When the difference value $|f(s)-f(p_i)|$ is the same as or greater than the correction standard value t, the pixel value f(s) of the center pixel s is determined as the first data value $k_i$, in operation S1308.

Such operations are respectively performed for all of the mask pixels p with respect to one center pixel s, via operations S1310 and S1312.

When the first data values $k_i$ are calculated for all of the mask pixels p, the sum of the first data values $k_i$ is calculated and the sum of the first data values $k_i$ are divided by the number Number(use(Ω)) of the mask pixels p and thus the second data value R[y][x] is calculated, in operation S1314.

The invention can also be embodied as computer readable codes on a computer readable recording medium. The computer readable recording medium is any data storage device that can store data which can be thereafter read by a computer system.

The computer readable codes are constituted to execute operations of the image processing method according to an embodiment of the invention when the codes are read and executed by the DSP 170 from the computer readable recording medium. The computer readable codes may be realized by various programming languages.

Also, functional programs, codes, and code segments for accomplishing an embodiment of the invention can be easily programmed by one of ordinary skilled in the art to which the invention pertains.

Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

According to various embodiments of the invention, freckles or wrinkles are efficiently removed and edges are not blurred. Accordingly, in the skin color correction according to various embodiments of the invention, freckles are removed and more natural result images may be obtained than those of general skin color correction techniques.

Software modules, which may implement various functions described above, may be stored as program instructions or computer readable codes executable on the processor on a computer-readable media such as read-only memory (ROM), random-access memory (RAM), CD-ROMs, magnetic tapes, floppy disks, and optical data storage devices. This media may be read by the computer, stored in the memory, and/or executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

Embodiments of the invention may be described in terms of functional block components and various processing steps. Such functional blocks may be realized by any number of hardware and/or software components configured to perform the specified functions. For example, embodiments of the invention may employ various integrated circuit components, e.g., memory elements, processing elements, logic elements, look-up tables, and the like, which may carry out a variety of functions under the control of one or more microprocessors or other control devices. Similarly, embodiments of the invention that are implemented using software programming or software elements may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, embodiments of the invention could employ any number of conventional techniques for electronics configuration, signal processing and/or control, data processing and the like.

The particular implementations shown and described herein are illustrative examples of the invention and are not intended to otherwise limit the scope of the invention. The connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

Numerous modifications and adaptations will be readily apparent to those skilled in this art without departing from the spirit and scope of the invention.

What is claimed is:

1. An image processing method, the method comprising:
    detecting a skin color region from an input image;
    taking a pixel included in the skin color region as a center pixel and determining a plurality of mask pixels located around the center pixel;
    calculating a difference value for each of the plurality of mask pixels, the difference value being the difference between a pixel value of a mask pixel and a pixel value of the center pixel;
    obtaining a first data value for each of the plurality of mask pixels based on a correction standard value, the first data value being the pixel value of a mask pixel when the difference value for the mask pixel is less than the correction standard value and the pixel value of the center pixel when the difference value for the mask pixel is the same as or greater than the correction standard value;
    obtaining a second data value by calculating the sum of the first data values for each of the plurality of mask pixels and dividing the sum of the first data values by the number of mask pixels; and
    correcting the pixel value of the center pixel according to the second data value.

2. The method of claim 1, wherein the plurality of mask pixels comprise one of a plurality of pixels located on a circle, an ellipse, a square, a combination of a circle and a square, and a combination of an ellipse and a square, the circle, the ellipse and the square being centered on the center pixel and having a size determined according to a mask size parameter.

3. The method of claim 2, further comprising determining the mask size parameter according to the size of the skin color region.

4. The method of claim 1, further comprising obtaining an average value of the second data value and the pixel value of the center pixel in the skin color region, wherein, in the correcting of the pixel value, the pixel value of the center pixel is corrected according to the average value.

5. The method of claim 1, further comprising determining the correction standard value according to the average value of the pixels in the skin color region.

6. The method of claim 1, wherein the skin color region is detected by comparing color component values of each of the pixels in the input image with ranges of skin color standard values based on a brightness value of each of the pixels in the input image.

7. The method of claim 1, wherein the correction standard value is determined based on a brightness value of each of the pixels in the skin color region.

8. An image processing apparatus, the apparatus comprising:
- a skin color region detecting unit that detects a skin color region from an input image;
- a mask pixel determining unit that determines a center pixel within the skin color region and a plurality of mask pixels located around the center pixel;
- a difference value calculating unit that calculates a difference value for each of the plurality of mask pixels between a pixel value of a mask pixel and a pixel value of the center pixel;
- a first data value calculating unit that obtains a first data value for each of the plurality of mask pixels based on a correction standard value, the first data value being the pixel value of a mask pixel when the difference value for the mask pixel is less than the correction standard value and the pixel value of the center pixel when the difference value for the mask pixel is the same as or greater than the correction standard value;
- a second data value calculating unit that obtains a second data value by calculating the sum of the first data values for each of the plurality of mask pixels and dividing the sum of the first data values by the number of mask pixels; and
- a correction unit that corrects the pixel value of the center pixel according to the second data value.

9. The apparatus of claim 8, wherein the plurality of mask pixels comprises one of a plurality of pixels located on a circle, an ellipse, a square, a combination of a circle and a square, and a combination of an ellipse and a square, the circle, the ellipse and the square being centered on the center pixel and having a size determined according to a mask size parameter.

10. The apparatus of claim 9, further comprising a mask size parameter determining unit that determines the mask size parameter according to the size of the skin color region.

11. The apparatus of claim 8, further comprising an average value calculating unit that obtains an average value of the second data value and the pixel value of the center pixel in the skin color region, wherein the correction unit is designed to correct the pixel value of the center pixel according to the average value.

12. The apparatus of claim 8, further comprising a correction standard value determining unit that determines the correction standard value according to the average value of the pixels in the skin color region.

13. The apparatus of claim 8, wherein the skin color region detecting unit is designed to detect the skin color region by comparing color component values of each of the pixels in the input image with ranges of skin color values based on a brightness value of each of the pixels in the input image.

14. A digital photographing apparatus that incorporates the image processing apparatus of claim 8.

15. A non-transitory computer program product, comprising a computer usable medium having a computer readable program code embodied therein, said computer readable program code adapted to be executed to implement a method for correcting an image, said method comprising:
- detecting a skin color region from an input image;
- taking a pixel included in the skin color region as a center pixel and determining a plurality of mask pixels located around the center pixel;
- calculating a difference value for each of the plurality of mask pixels, the difference value being the difference between a pixel value of a mask pixel and a pixel value of the center pixel;
- obtaining a first data value for each of the plurality of mask pixels based on a correction standard value, the first data value being the pixel value of a mask pixel when the difference value for the mask pixel is less than the correction standard value and the pixel value of the center pixel when the difference value for the mask pixel is the same as or greater than the correction standard value;
- obtaining a second data value by calculating the sum of the first data values for each of the plurality of mask pixels and dividing the sum of the first data values by the number of mask pixels; and
- correcting the pixel value of the center pixel according to the second data value.

16. The non-transitory computer program product of claim 15, wherein the plurality of mask pixels comprise one of a plurality of pixels located on a circle, an ellipse, a square, a combination of a circle and a square, and a combination of an ellipse and a square, the circle, the ellipse and the square being centered on the center pixel and having a size determined according to a mask size parameter.

17. The non-transitory computer program product of claim 16, further comprising determining the mask size parameter according to the size of the skin color region.

18. The non-transitory computer program product of claim 15, further comprising obtaining an average value of the second data value and the pixel value of the center pixel in the skin color region, wherein the pixel value of the center pixel is corrected according to the average value.

19. The non-transitory computer program product of claim 15, further comprising determining the correction standard value according to the average value of the pixels in the skin color region.

20. The non-transitory computer program product of claim 15, wherein the skin color region is detected by comparing color component values of each of the pixels in the input image with ranges of skin color standard values based on a brightness value of each of the pixels in the input image.

* * * * *